June 1, 1937. R. E. S. GEARE 2,082,540
FLAT BELT DRIVE
Filed July 29, 1935
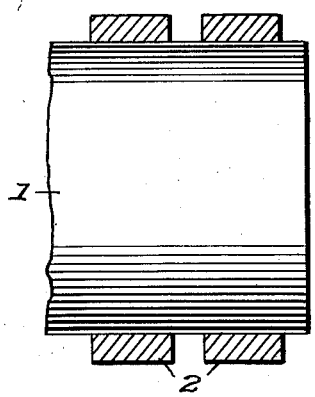
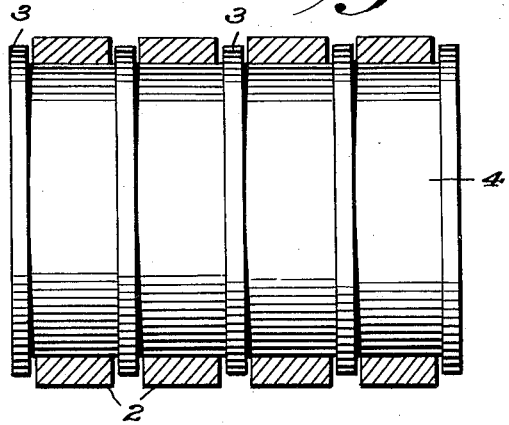
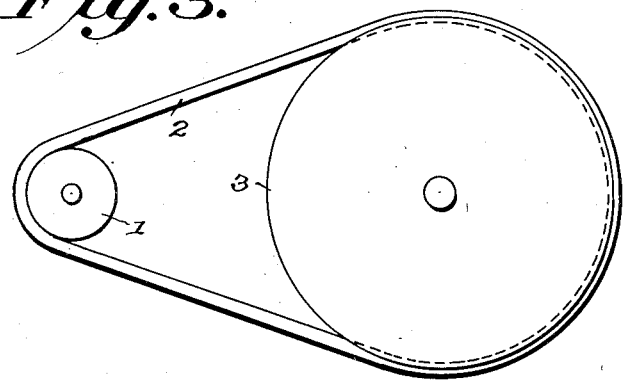
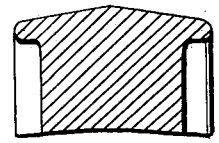
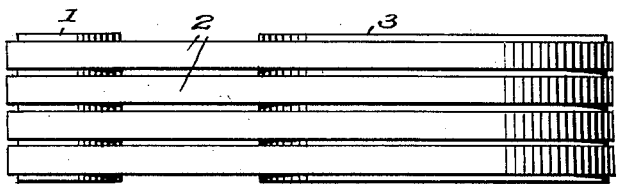
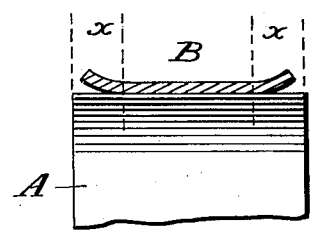

Patented June 1, 1937

2,082,540

UNITED STATES PATENT OFFICE 2,082,540

FLAT BELT DRIVE

Randolph E. S. Geare, Philadelphia, Pa., assignor to L. H. Gilmer Co., Philadelphia, Pa., a corporation of New Jersey Application July 29, 1935, Serial No. 33,758

2 Claims. (Cl. 74—219)

This invention relates to improvements in drive belts and particularly to a belt construction designed to take the place of wide flat driving belts and to overcome working deficiencies inherent to the use of such belts.

As is known, wide flat driving belts require long center distances and when these wide belts are used the slack side, usually the upper side, is always swaying from side to side as it goes on to the driven pulley—meaning that it is always seeking its average position. This is due both to difference in length between the two sides and variation characteristics at different points of the belt. Various devices have been employed for keeping a tension on wide flat belts on short center distances, which devices put a terrific strain on the bearings.

A wide flat belt cannot be worked on short centers due to the fact that the length of the sides is never the same and there is always a tendency for the belt to concave in the center when it is bent over a sheave or pulley. This causes the belt to jump off the pulley if the center distances are too short. The idea of long center distances for wide belts is to add sufficient weight on the slack side so that this weight will tend to pull the belt out straight as it goes on the driven pulley.

These difficulties relative to the wide flat power belt are known to all users, and the users realize the advantages of the V-belt drive, but frequently do not wish to incur the expense of throwing their flat pulleys away and installing new sheaves for the V-drive, and it is impractical to use the V-belts with two flat pulleys.

With these difficulties known to belt users, and in an effort to overcome them it has been proposed in the prior art to connect a plurality of narrow flat belts together with a connector, such as a metal link, textile threads, etc., spaced at close intervals, the idea being to try to make these plurality of connected narrow belts serve as a wide flat belt. But in these efforts it has been overlooked that each of these narrow flat belts has a different rate of creep. The net result therefore has been that the connectors joining the belts together are broken by this creep. There is also the tendency for one belt to climb upon the next adjacent belt.

The object of my invention is to overcome the above noted objections in flat power transmission belts and make them operate satisfactorily on short center drives without undue tension being placed upon them, by providing a multiple flat belt drive in which each belt may flex and creep independent of the other belts whereby it is possible to break up any given width of belt into a plurality of small width flat non-connected belts which may be treated as an individual unit and may be so constructed that it will operate over a small diameter pulley on very short center distances. By having the individual belts, making up the unit, entirely separate and distinct from each other, each belt can do its own fractional part of the load and flex over a very small diameter pulley placed at an extremely short center distance from one another.

In the drawing:

Figure 1 is a front elevation of a flat pulley with belts placed upon it according to my invention, the belts being in section.

Figure 2 is a similar view showing a modified or guiding pulley, the driving surface of which may be flat or convexed.

Figure 3 is a side outline view of a multiple flat belt drive.

Figure 4 is a top plan view of Figure 3.

Figure 5 is a detail view showing a convexed driving surface.

Figure 6 is a detail view of a portion of a sheave with a belt thereon.

In the drawing the reference numeral 1 designates a belt pulley, or sheave, designed for a flat belt drive. The flat belt multiple drive unit, according to my invention, is composed of a number of separate, independent and distinct comparatively narrow flat belts 2, each of which, when in operation, is free to creep at its respective rate and assume its own fractional part of the load independent of the other belts in the unit. This set, or unit, of comparatively narrow flat belts can be used on short centers, which is a very material consideration, but it is obvious, of course, that the use of my improved power transmission is not limited to "short center" drives.

By utilizing a plurality of driving elements, each element may have a relatively narrow width, thus permitting the use of pulleys having minimum diameter.

Each individual element of the plural drive may be replaced independently of the others, in case said element is defective and wears more rapidly than the others.

By utilizing a plurality of endless driving elements, one or more elements may also be added or subtracted in order to accommodate variable transmission requirements.

In practice I have found that various belts creep at different rates, but this does not affect the pulling power of each belt of the unit. Further, I have found that with my improved driving unit it is possible to mantain a driving tension without recourse to idlers.

If desired the pulleys may be provided with guides 3 between which the belts 2a of the unit are independently guided on the pulley 4, but these guides are not essential to the successful operation of my improved unit.

In Figure 6 I have shown a sheave A having a flat driving face, and a flat belt B mounted therein, the belt being in section. The only purpose of this illustration is to show the known fact that a flat belt tends to concave on a sheave surface as shown. For a distance inward from its side edges it will be seen that the belt is not in contact with the sheave and this surface is useless as a working part of the belt. If, however, this same belt width were cut in narrow strips the width X would become an independent narrow belt and lay flat on the sheave thereby adding its pulling power to the rest of the belt width. By making the same belt width, in the form of narrow non-connected independent strips, multiple belts of greater pulling power for a given width of belt surface is obtained. This is an actual commercial proven fact.

What I claim is:

1. A short center drive flat drive belt structure comprising driving and driven pulleys each of a substantially uniform diameter from side to side thereof, said pulleys being rotatable about substantially parallel axes and providing comparatively wide belt engaging surfaces, a drive belt unit formed of a plurality of individual narrow flat belts arranged side by side and extending between and engaging said belt engaging surfaces of the pulleys, said belts being free from connection with each other and from imposed tensions thereon to allow individual flexing actions and independent and differential creeping actions thereof relative to each other and to the pulleys and forming fractional pulling elements adapted owing to their relatively narrow widths and freedom from restricting connections with each other to maintain their flat form in travel about the belt engaging surfaces of the pulleys whereby to make the traction pull uniform from side to side of the drive belt unit, whereby the sum total of a tractive effort of said flat belts is substantially greater than the tractive effort of a single belt having substantially the same width as the sum total width of said flat belts.

2. A short center drive flat drive belt structure comprising driving and driven pulleys each of a substantially uniform diameter from side to side thereof, said pulleys being rotatable about substantially parallel axes and providing comparatively wide belt engaging surfaces, a drive belt unit formed of a plurality of individual narrow flat belts arranged side by side and extending between and engaging said belt engaging surfaces of the pulleys, and means on the pulleys for guiding and maintaining the belts in spaced relationship, said belts being free from connection with each other and from imposed tension thereon individual flexing actions and independent differential creeping actions thereof relative to each other and to the pulleys and forming fractional pulling elements adapted owing to their relatively narrow widths and freedom from restricting connections with each other to maintain their flat form in travel about the belt engaging surfaces of the pulleys whereby to make the traction pull uniform from side to side of the drive belt unit, whereby the sum total of a tractive effort of said flat belts is substantially greater than the tractive effort of a single belt having substantially the same width as the sum total width of said flat belts.

RANDOLPH E. S. GEARE.